US009003393B2

(12) United States Patent
Bhullar et al.

(10) Patent No.: US 9,003,393 B2
(45) Date of Patent: *Apr. 7, 2015

(54) HTML DIRECTED ADAPTIVE FEATURES FOR MOBILE APPLICATIONS

(71) Applicant: Disney Enterprises, Inc., Burbank, CA (US)

(72) Inventors: Bicrumjit Singh Bhullar, San Jose, CA (US); Albert Riley Howard, Jr., Sunnyvale, CA (US); Anthony Young, Alameda, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,991

(22) Filed: Apr. 22, 2014

(65) Prior Publication Data

US 2014/0229439 A1  Aug. 14, 2014

Related U.S. Application Data

(63) Continuation of application No. 13/316,295, filed on Dec. 9, 2011, now Pat. No. 8,769,524.

(51) Int. Cl.
*G06F 9/44* (2006.01)
*G06F 9/445* (2006.01)
*G06F 17/30* (2006.01)

(52) U.S. Cl.
CPC ...... *G06F 17/30887* (2013.01); *G06F 9/44521* (2013.01); *G06F 17/30345* (2013.01); *G06F 8/65* (2013.01)

(58) Field of Classification Search
None
See application file for complete search history.

(56) References Cited

U.S. PATENT DOCUMENTS

| 5,991,760 | A  | * | 11/1999 | Gauvin et al. | 1/1 |
| 7,676,553 | B1 | * | 3/2010 | Laucius et al. | 709/219 |
| 7,827,546 | B1 | * | 11/2010 | Jones et al. | 717/173 |
| 8,607,221 | B1 | * | 12/2013 | Donahue et al. | 717/173 |
| 8,667,480 | B1 | * | 3/2014 | Sigurdsson et al. | 717/171 |
| 8,769,524 | B2 | * | 7/2014 | Bhullar et al. | 717/173 |
| 2004/0093376 | A1 | * | 5/2004 | De Boor et al. | 709/203 |
| 2009/0318192 | A1 | * | 12/2009 | Leblanc et al. | 455/558 |
| 2010/0114860 | A1 | * | 5/2010 | Choi et al. | 707/709 |

(Continued)

OTHER PUBLICATIONS

"Autoupdating", Google Chrome, retrieved from <https://developer.chrome.com/extensions/autoupdate>, total p. 3.*

*Primary Examiner* — Don Wong
*Assistant Examiner* — Marina Lee
(74) *Attorney, Agent, or Firm* — Farjami & Farjami LLP

(57) ABSTRACT

There is provided a method for HTML directed adaptive features for mobile applications. By presenting user interface portions of the application as HTML documents referenced from a manifest file, the manifest file may be updated from a remote server without directly modifying a native binary of the application. By registering URL handlers for application functions in the native binary of the application, and by modifying a local file manifest stored on a mobile device, the scope of application functionality can be updated by adding, removing, or modifying URLs. The manifest files may further be adapted using specific contexts, such as device hardware, location, user profile data, and other information. Advantageously, application update approval processes through application marketplaces may be bypassed since the native binary is kept intact, allowing for more timely and relevant updates.

20 Claims, 3 Drawing Sheets

(56) References Cited

U.S. PATENT DOCUMENTS

| | | | |
|---|---|---|---|
| 2010/0229045 A1* | 9/2010 | Schultz et al. | 714/37 |
| 2012/0166655 A1* | 6/2012 | Maddali et al. | 709/228 |
| 2013/0152070 A1* | 6/2013 | Bhullar et al. | 717/173 |
| 2013/0166906 A1* | 6/2013 | Swaminathan et al. | 713/155 |
| 2014/0229439 A1* | 8/2014 | Bhullar et al. | 707/626 |

* cited by examiner

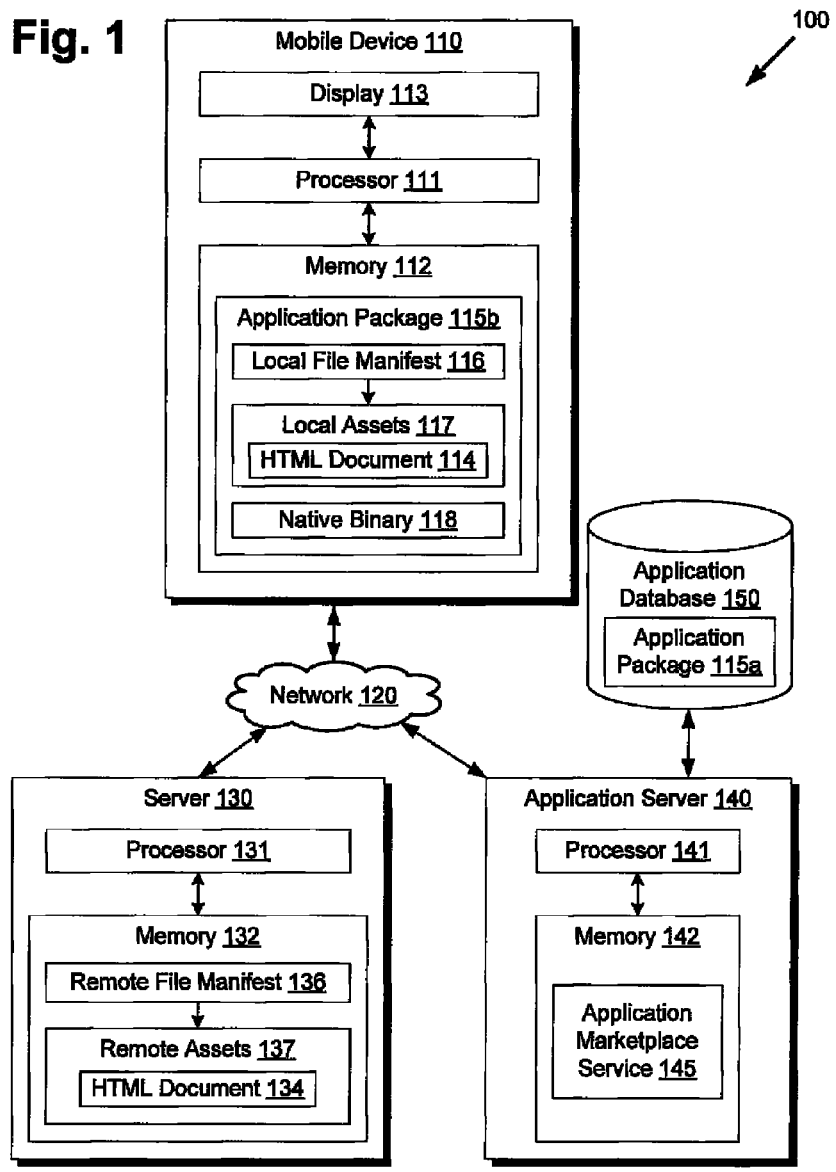

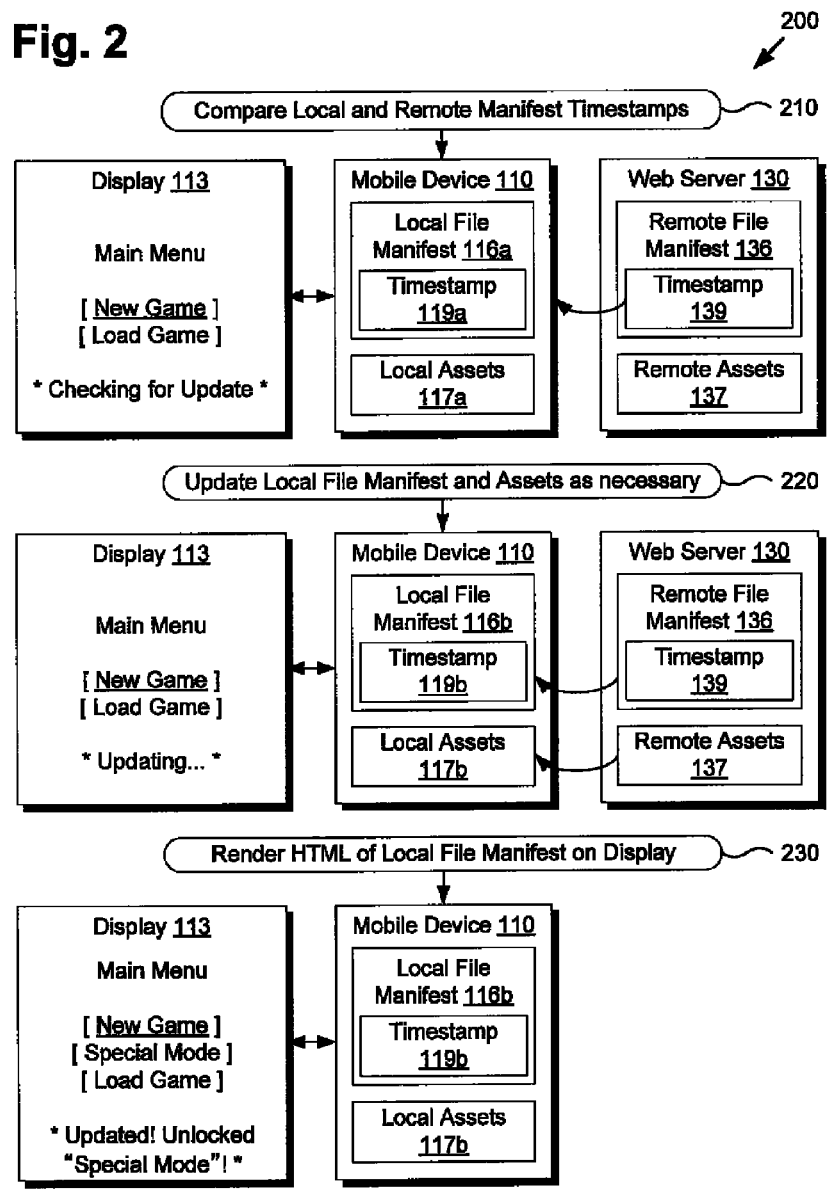

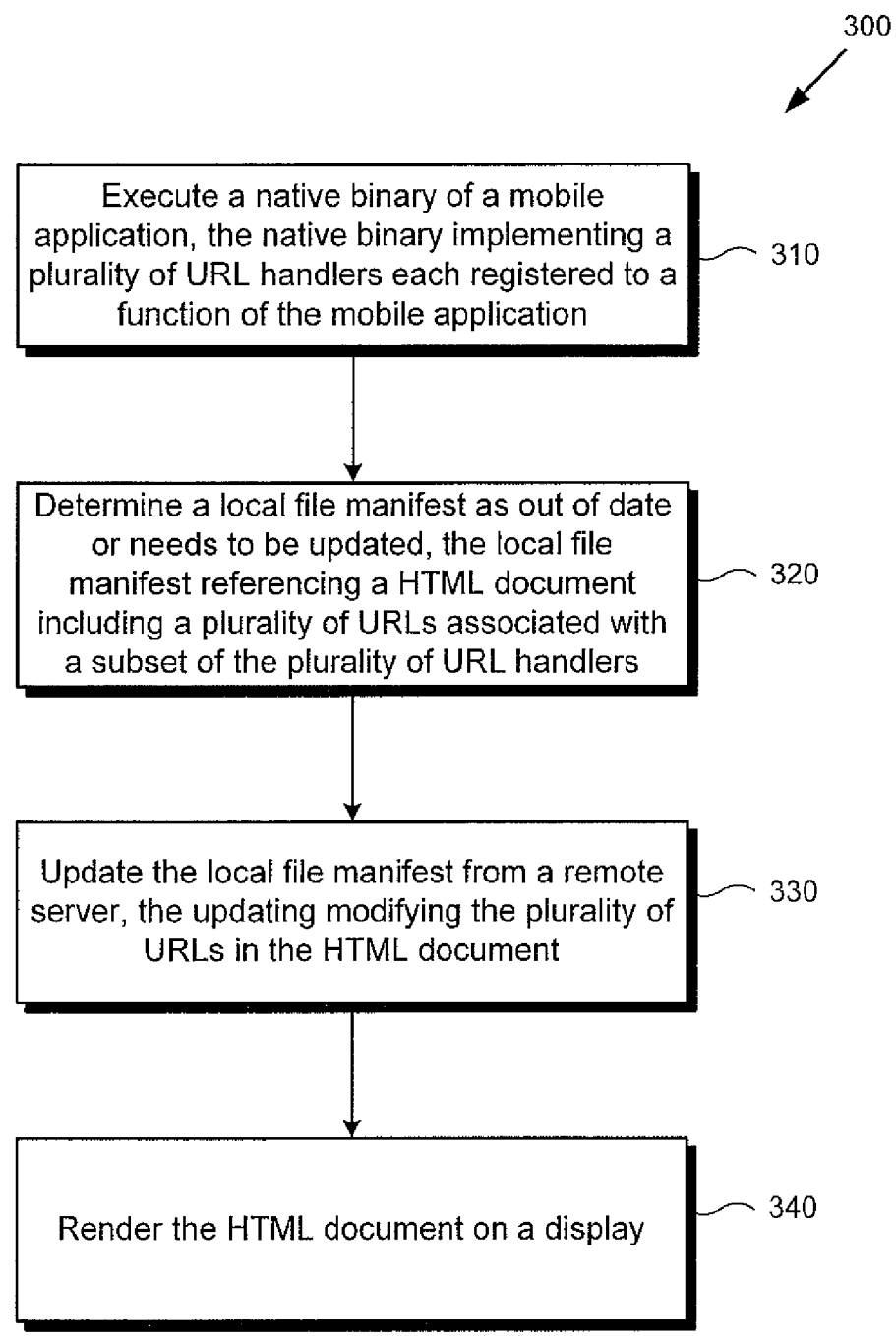

HTML DIRECTED ADAPTIVE FEATURES FOR MOBILE APPLICATIONS

This application is a Continuation of U.S. application Ser. No. 13/316,295, filed Dec. 9, 2011, now U.S. Pat. No. 8,769,524, which is hereby incorporated by reference in its entirety.

BACKGROUND

Mobile application development is often an ongoing process, allowing developers to respond to user feedback and provide added value. Conventionally, a developer may periodically release an application update to fix programming errors, add or unlock new features and content, tailor an application to a seasonal holiday or event, or to provide other enhancements. In this manner, user interest in the mobile application may be sustained over a longer period of time, possibly leading to additional purchases and increased developer goodwill.

Many mobile application ecosystems have focused on using a centralized application marketplace, which provides a secure and convenient location for application purchases and downloads. As part of the application marketplace submission process, each application update must conventionally undergo an approval process to meet various guidelines for content, behavior, privacy settings, intellectual property clearances, compatibility, and other regulations. However, the progress of this approval process may be difficult to predict, leading to unexpected delays. As a result, time sensitive application updates may exceed anticipated deadlines, often due to circumstances beyond developer control.

SUMMARY

The present disclosure is directed to HTML directed adaptive features for mobile applications, substantially as shown in and/or described in connection with at least one of the figures, as set forth more completely in the claims.

BRIEF DESCRIPTION OF THE DRAWINGS

FIG. 1 presents an exemplary diagram of a system for HTML directed adaptive features for mobile applications;

FIG. 2 presents an exemplary diagram of a mobile application update process to provide HTML directed adaptive features;

FIG. 3 presents an exemplary flowchart illustrating a method for providing HTML directed adaptive features for mobile applications.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary diagram of a system for HTML directed adaptive features for mobile applications. Diagram 100 of FIG. 1 includes mobile device 110, network 120, server 130, application server 140, and application database 150. Mobile device 110 includes processor 111, memory 112, and display 113. Memory 112 includes application package 115b. Application package 115b includes local file manifest 116, local assets 117, and native binary 118. Local assets 117 includes HTML document 114. Server 130 includes processor 131 and memory 132. Memory 132 includes remote file manifest 136 and remote assets 137. Remote assets 137 includes HTML document 134. Application server 140 includes processor 141 and memory 142. Memory 142 includes application marketplace service 145. Application database 150 includes application package 115a.

Mobile device 110 may be a smartphone, a tablet, a laptop computer, or any other device. Mobile device 110 may connect to network 120, which may include a public network such as the Internet. An operating system of mobile device 110 (not shown in FIG. 1) may include built-in application store functionality to interface with application marketplace service 145 executing on processor 141 of application server 140. Thus, a user of mobile device 110 may browse and purchase a variety of application programs stored in application database 150. For simplicity, only application package 115a is shown in application database 150. After the user decides to purchase application package 115a, it may be transferred to mobile device 110 over network 120 and stored in memory 112 as application package 115b. Thus, memory 112 may be non-volatile storage such as flash memory.

As shown in FIG. 1, application package 115b may include several parts. Local file manifest 116 is a list of files including one or more HTML documents and other file assets that may be used to render a portion of the user interface for application package 115b. Thus, for example, local file manifest 116 might reference HTML documents and graphical assets corresponding to a title screen, an options screen, or another interface screen of application package 115b. Accordingly, local file manifest 116 may reference HTML document 114 within local assets 117, which might represent a main menu user interface. Multiple file manifest files may be used, but for simplicity only local file manifest 116 is shown. HTML documents referenced within local file manifest 116 may include a plurality of URLs directly referencing various functions of native binary 118, which are parsed by corresponding URL handlers registered for application package 115b. For example, native binary 118 may parse all registered URL handlers to allow local HTML documents to reference and invoke various functions of native binary 118, whereas non-registered URLs and other portions of HTML documents may be rendered conventionally using a web browser library or a built-in web browser.

Local assets 117 may include various data files referenced by local file manifest 116 and native binary 118. Thus, for example, local assets 117 may include graphics such as bitmaps and three-dimensional models, sounds, music, animation, text, data tables, and other resources. Local assets 117 may also include files referenced from local file manifest 116, including HTML documents and data referenced from such HTML documents including compressed images, sounds, plug-in data, style sheets, scripts, interpreted language code, and other data.

When a user initiates an execution of application package 115b, for example by touching an application icon on a home screen shown in display 113, processor 111 may load and execute native binary 118, which is a compiler result to be natively executed by processor 111. After native binary 118 begins execution, local file manifest 116 may be examined to determine whether it is out of date or needs to be updated. For example, native binary 118 may contact server 130 through HTTP or another protocol to request remote file manifest 136, and may compare timestamps between the local and remote file manifests. If timestamps within the remote file manifest are newer, native binary 118 may update local file manifest 116 and local assets 117 using remote file manifest 136 and remote assets 137 respectively, as further discussed in FIG. 2.

Thus, the functionality or aesthetic of application package 115b may be modified without modifying native binary 118. A developer may adjust remote file manifest 136 and remote assets 137 on server 130, including HTML document 134, to push updates to all mobile devices utilizing application package 115a. Thus, for updates that do not require changes to native binary 118, the developer may instead modify remote HTML document 134 referenced by remote file manifest 136 to add, change, or remove URLs invoking various features supported by registered URL handlers already existing and implemented by native binary 118. Since no new binary code is patched into native binary 118, an application review process through application marketplace service 145 may be advantageously avoided, as application package 115a may remain unchanged within application database 150.

FIG. 2 presents an exemplary diagram of a mobile application update process to provide HTML directed adaptive features. Elements of FIG. 2 may correspond to similar elements with like numbering in FIG. 1. Some elements from FIG. 1 are omitted in FIG. 2 for simplicity.

Processor 111 of mobile device 110 may render local file manifest 116a for showing on display 113. As shown in display 113, local file manifest 116a may reference a HTML document representing a main menu user interface, which may be immediately shown after launching application package 115b. A status message may also be provided to inform the user of the update process progression.

Process 200 of FIG. 2 may begin by comparing local and remote manifest timestamps (210). Thus, mobile device 110 may retrieve remote file manifest 136 from server 130. Each file reference within local file manifest 116a may include an associated timestamp, however for simplicity only a single timestamp 119a is shown in FIG. 2. Similarly, each file reference within remote file manifest 136 may include an associated timestamp, of which only timestamp 139 is shown. Timestamp 119a may correspond to a timestamp of HTML document 114 from FIG. 1, and timestamp 139 may correspond to a timestamp of HTML document 134 from FIG. 1. While timestamps are used in the example shown in FIG. 2, any suitable identifier may be utilized for comparison, such as a version number or a hash value. A higher version number or a changed hash value may be interpreted as being equivalent to a newer timestamp. If timestamp 119a is newer or the same as timestamp 139, and no further timestamps need to be compared, then process 200 may be halted and normal execution of native binary 118 on processor 111 may continue, since an update is not necessary.

On the other hand, if timestamp 119a is older than timestamp 139, then process 200 may proceed to update local file manifest 116a and local assets 117b, as necessary (220). Generally, the contents of remote file manifest 136 may replace the contents of local file manifest 116a, resulting in local file manifest 116b. Timestamp 119a is also set equal to timestamp 139, resulting in timestamp 119b. If additional or updated assets are referenced by the updated manifest, for example an updated HTML document, then the additional or updated assets may be downloaded from remote assets 137 and added to local assets 117a, resulting in local assets 117b. Optionally, orphaned assets may be purged from local assets 117b.

Next, the updated HTML document referenced by the updated local file manifest 116b may be rendered on display 113. As shown in display 113, the updating of local file manifest 116a to local file manifest 116b updates the HTML document to add a new main menu item for "Special Mode". Graphical button images for the "Special Mode" menu selection may have also been downloaded into local assets 117b for rendering on display 113. The application developers may have developed the "Special Mode" game mode in advance so that all the content related to the "Special Mode" is in application package 115a, which is already approved and stored in application database 150. At an opportune time, for example to garner user interest and boost sales during a holiday season, the "Special Mode" feature may be unlocked to users without having to formally validate an application update through application marketplace service 145. Thus, a function or feature that is already programmed into native binary 118 may be timely unlocked from application package 115b using process 200, as described above.

While the example shown in process 200 of FIG. 2 relates to the adding of a new feature, remote file manifest 136 may also be used to modify or remove features as well. For example, after the holiday period is over, remote file manifest 136 and remote assets 137 may be modified again to remove the URL in the HTML document triggering the "Special Mode" URL handler. If user feedback indicates that game difficulty may be set too high, the URL for "New Game" may be modified to trigger a URL handler for initiating "Easy Mode" instead, or a difficulty slider may be introduced into the main menu interface. Besides modifying application functionality, the updates to remote file manifest 136 and remote assets 137 may alternatively or additionally change the aesthetics of the user interface, for example by changing backgrounds, layout, fonts, colors, sounds, and other elements.

Additionally, remote file manifest 136 and remote assets 137 may also be specifically tailored to the context of mobile device 110. For example, the device model and hardware capabilities of mobile device 110 may be detected, and remote file manifest 136 and remote assets 137 may be customized to provide features that are optimized for the specific capabilities of mobile device 110. For example, if display 113 is a high-resolution display, a new menu option "New Game (HD)" may be unlocked for the user of mobile device 110, providing enhanced visual quality. Conversely, if display 113 is low resolution or if the graphics capabilities of mobile device 110 are modest, then a new menu option "New Game (Legacy Hardware)" may be unlocked, providing improved performance for older hardware.

A location of mobile device 110 may also be utilized to tailor remote file manifest 136. For example, GPS receivers, Wi-Fi triangulation, and other methods of location sensing may be utilized to derive a location of mobile device 110. Remote file manifest 136 and remote assets 137 may then be modified based on this location. For example, if application package 115b corresponds to a sports game, then a menu item to play as a local sports team might be introduced into remote file manifest 136 and remote assets 137. In another example, weather for the sensed location may be retrieved, and remote file manifest 136 and remote assets 137 may be modified such that in-game weather matches local weather conditions. In yet another example, if application package 115b corresponds to a music rhythm game, and a music festival or band concert is in progress near the location of mobile device 110, then songs related to the music festival or band might be unlocked for the music rhythm game.

User account, profile, and history data may also be utilized to tailor remote file manifest 136 and remote assets 137. For example, based on the play history and play style of the user, remote file manifest 136 and remote assets 137 may be modified to tailor gameplay to more closely suit the play style of the user. Thus, if the user typically only plays for short sessions lasting a few minutes, a new menu option for "Time Trial" or "Score Attack" might be unlocked. If the user is able to complete many game levels without mistakes, a new menu option for "Hard Mode" might be unlocked to provide a challenge more suited to the skill level of the user. Conversely, if the user appears to be stuck on a particular level or challenge, a new menu option for "Easy Mode" or a demonstration play movie might be unlocked.

In this manner, developers of mobile applications can nimbly respond to user feedback and device or account context, providing a streamlined, fresh, and exciting user experience to sustain long-term user interest and to provide added value. Since the updates may completely bypass the conventional application update approval process associated with application marketplace service 145, HTML directed adaptive features for mobile applications can be directly and timely pushed to users via process 200 of FIG. 2. Thus, only major application updates requiring modifications to native binary 118 are necessary for submission into the conventional application approval process.

FIG. 3 presents an exemplary flowchart illustrating a method for providing HTML directed adaptive features for mobile applications. Flowchart 300 of FIG. 3 begins when processor 111 of mobile device 110 executes native binary 118 of application package 115b (310). As previously discussed, native binary 118 implements a plurality of URL handlers each registered to a function of application package 115b. Thus, by embedding corresponding URLs within HTML documenters referenced by local file manifest 116, various features of application package 115b may be invoked.

Next, processor 111 of mobile device 110 determines local file manifest 116a as out of date or needs to be updated (320). Local file manifest 116a references a HTML document that includes a plurality of URLs associated with a subset of the plurality of URL handlers registered into native binary 118. Thus, at least initially, local file manifest 116a does not reference all the available features of application package 115b, but only a subset of the available features. As shown in FIG. 2 (210), local file manifest 116a may be compared to remote file manifest 136 on server 130. More specifically, timestamp 119a may be compared to timestamp 139. If timestamp 119a is the same or newer than timestamp 139, then flowchart 300 may terminate. If timestamp 119a is older than timestamp 139, then flowchart 300 may proceed. As previously discussed, other identifiers may also be used instead of timestamps, such as version numbers or hash values.

Next, processor 111 of mobile device 110 updates local file manifest 116a from server 130, the updating modifying the plurality of URLs in the HTML document (330). For example, referring to FIG. 2 (220), remote file manifest 136 may replace local file manifest 116a to result in local file manifest 116b, and any new or updated assets from remote assets 137 may be stored in local assets 117a to result in local assets 117b. As previously discussed, the modifying of local file manifest 116a to 116b may result in adding, removing, or modifying a URL in a HTML document referenced therein, which in turn results in a corresponding change to the plurality of URLs. As such, the subset of the plurality of URL handlers which are triggered by local file manifest 116b may increase, decrease, or modify various features available within application package 115b.

For example, a new URL may be added to a referenced HTML document after transitioning from local file manifest 116a to 116b, the new URL being associated with one of the plurality of URL handlers not from the prior subset of the plurality of URL handlers. Accordingly, the subset of the plurality of URL handlers that are triggered may expand to cover a greater scope of functionality for application package 115b, thereby providing HTML directed adaptive features. Similarly, URL modifications or removals may adjust the scope of application functionality to adapt to user preferences or various contexts. As previously discussed, remote file manifest 136 may be tailored to the user by utilizing a hardware context of mobile device 110, a location of mobile device 110, user account data, profile data, history data, and other contextual data.

Next, processor 111 of mobile device 110 renders the HTML document from the updated local file manifest 116b on display 113 (340). For example, if a URL is added to the HTML document of local file manifest 116a that references a URL handler for a "Special Mode" game function, display 113 may appear similar to FIG. 2 (230). If the user selects the "Special Mode" menu option, for example by touching the menu option, processor 111 may respond by invoking the URL handler for launching the "Special Mode" game function. Thus, by modifying only remote file manifest 136 and remote assets 137 on server 130, functions and features of application package 115b may be unlocked during update process 200 and directly initiated by user selections. Advantageously, application developers may bypass the conventional application submission process for application marketplace service 145, enabling more timely and relevant updates through HTML directed adaptive features.

Moreover, besides providing a timely update mechanism, the HTML directed adaptive features also provide other advantages for an improved user experience. For example, updating of the user interface using the above described process may be deferred to strategic time windows, for example at the very start of the application or during idle times. Since only the user interface elements that are updated need to be downloaded to the mobile device, bandwidth usage and wait times are minimized, providing a better user experience. This may be a significant benefit for applications with large download sizes. Since the update may bypass the conventional application submission process, time sensitive promotions and updates may be easily deployed, for example by providing a special Christmas themed application or game mode which is unlocked on Christmas day. Since the Christmas themed content may already be referenced in the initially approved application and merely unlocked by using HTML directed adaptive features, no "new" application content is introduced, avoiding the triggering of any new content review processes. Furthermore, the HTML directed adaptive features may be combined with various analytics platforms, providing valuable data for improving the user experience and maximizing the efficacy of promotions and in-application commerce.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for providing HyperText Markup Language (HTML) directed adaptive features for a mobile application, the method comprising:
   downloading the mobile application from an application marketplace, the mobile application including a local file manifest and a native binary including all of executable binary code of the mobile application;
   executing the native binary of the mobile application, the native binary implementing a plurality of Uniform Resource Locator (URL) handlers each registered to a function of the mobile application;
   determining the local file manifest of the mobile application needs to be updated, the local file manifest referencing a HTML document including a plurality of URLs associated with a subset of the plurality of URL handlers;
   updating the local file manifest of the mobile application from a remote server without updating any of the executable binary code of the mobile application, the updating modifying the plurality of URLs in the HTML document;
   rendering the HTML document from the updated local file manifest on a display.

2. The method of claim 1, wherein the modifying of the plurality of URLs is by adding a new URL to the plurality of URLs, the new URL associated with one of the plurality of URL handlers not from the subset of the plurality of URL handlers.

3. The method of claim 1, wherein the modifying of the plurality of URLs is by removing a URL from the plurality of URLs.

4. The method of claim 1, wherein the modifying of the plurality of URLs is by modifying a URL from the plurality of URLs.

5. The method of claim 1, further comprising:
   invoking one of the plurality of URL handlers in response to a selection of a URL from the plurality of URLs.

6. The method of claim 1, further comprising:
   storing a remote asset referenced by the local file manifest as a local asset, the remote asset retrieved from the remote server.

7. The method of claim 1, wherein the updating modifying the plurality of URLs in the HTML document creates a plurality of modified URLs associated with a second subset of the plurality of URL handlers.

8. A mobile device providing HyperText Markup Language (HTML) directed adaptive features for a mobile application, the mobile device comprising:
   a memory including a mobile application, the mobile application including a local file manifest and a native binary;
   a processor configured to:
      downloading the mobile application from an application marketplace, the mobile application including a local file manifest and a native binary including all of executable binary code of the mobile application;
      execute the native binary of the mobile application, the native binary implementing a plurality of Uniform Resource Locator (URL) handlers each registered to a function of the mobile application;
      determine the local file manifest of the mobile application needs to be updated, the local file manifest referencing a HTML document including a plurality of URLs associated with a subset of the plurality of URL handlers;
      update the local file manifest of the mobile application from a remote server without updating any of the executable binary code of the mobile application, the updating modifying the plurality of URLs in the HTML document;
      render the HTML document from the updated local file manifest on a display.

9. The mobile device of claim 8, wherein the modifying of the plurality of URLs is by adding a new URL to the plurality of URLs, the new URL associated with one of the plurality of URL handlers not from the subset of the plurality of URL handlers.

10. The mobile device of claim 8, wherein the modifying of the plurality of URLs is by removing a URL from the plurality of URLs.

11. The mobile device of claim 8, wherein the modifying of the plurality of URLs is by modifying a URL from the plurality of URLs.

12. The mobile device of claim 8, the processor further configured to:
   invoke one of the plurality of URL handlers in response to a selection of a URL from the plurality of URLs.

13. The mobile device of claim 8, the processor further configured to:
   store a remote asset referenced by the local file manifest as a local asset, the remote asset retrieved from the remote server.

14. A system for providing HyperText Markup Language (HTML) directed adaptive features for a mobile application, the system comprising:
   an application server providing access to an application database through an application marketplace service;
   a server including a remote file manifest;
   a mobile device having a processor configured to:
      downloading the mobile application from an application marketplace, the mobile application including a local file manifest and a native binary including all of executable binary code of the mobile application;
      execute, by the processor, the native binary of the mobile application, the native binary implementing a plurality of Uniform Resource Locator (URL) handlers each registered to a function of the mobile application;
      determine, by the processor, the local file manifest of the mobile application needs to be updated, the local file manifest referencing a HTML document including a plurality of URLs associated with a subset of the plurality of URL handlers;
      update, by the processor, the local file manifest of the mobile application from a remote server without updating any of the executable binary code of the mobile application, the updating modifying the plurality of URLs in the HTML document;
      render, by the processor, the HTML document from the updated local file manifest on a display.

15. The system of claim 14, wherein the modifying of the plurality of URLs is by adding a new URL to the plurality of URLs, the new URL associated with one of the plurality of URL handlers not from the subset of the plurality of URL handlers.

16. The system of claim 14, wherein the modifying of the plurality of URLs is by removing a URL from the plurality of URLs.

17. The system of claim 14, wherein the modifying of the plurality of URLs is by modifying a URL from the plurality of URLs.

18. The system of claim 14, the processor of the mobile device further configured to:
   invoke one of the plurality of URL handlers in response to a selection of a URL from the plurality of URLs.

19. The system of claim 14, the processor of the mobile device further configured to:
   store a remote asset referenced by the local file manifest as a local asset, the remote asset retrieved from the remote server.

20. The system of claim 14, wherein the updating modifying the plurality of URLs in the HTML document creates a plurality of modified URLs associated with a second subset of the plurality of URL handlers.

* * * * *